H. F. PORTER.
PYROMETRY.
APPLICATION FILED APR. 18, 1919.
1,363,267.
Patented Dec. 28, 1920.
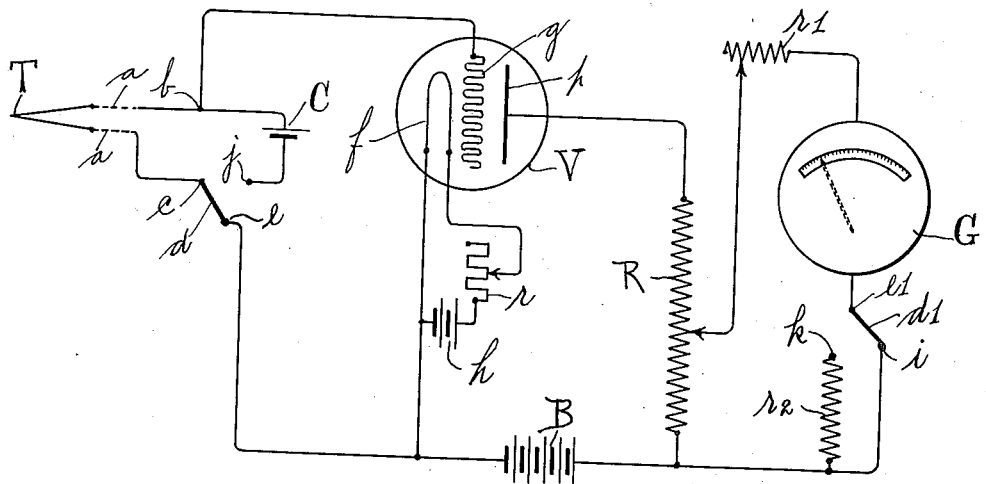
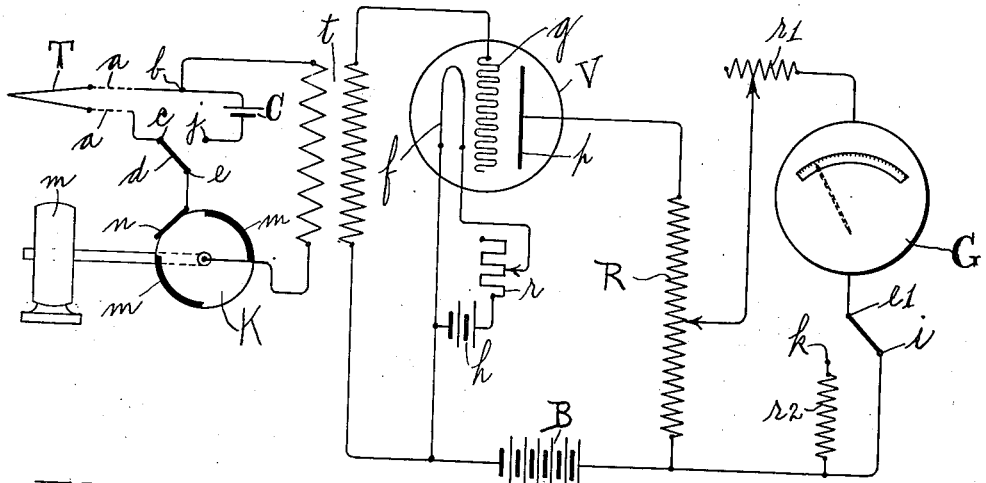
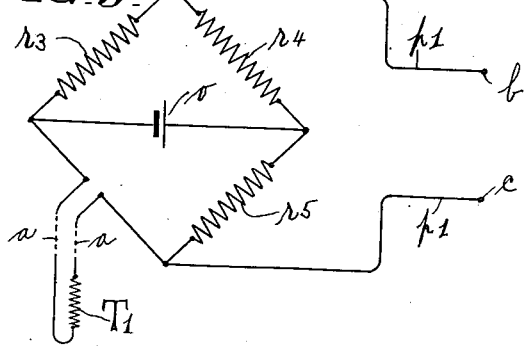
INVENTOR
Harry F. Porter
BY
Cornelius D. Ehret
his ATTORNEY.

UNITED STATES PATENT OFFICE.

HARRY F. PORTER, OF TRENTON, NEW JERSEY, ASSIGNOR TO PYROLECTRIC INSTRUMENT CO., OF TRENTON, NEW JERSEY, A CORPORATION OF NEW JERSEY.

PYROMETRY.

1,363,267.  Specification of Letters Patent.  Patented Dec. 28, 1920.

Application filed April 18, 1919. Serial No. 291,045.

*To all whom it may concern:*

Be it known that I, HARRY F. PORTER, a citizen of the United States, residing at Trenton, county of Mercer, State of New Jersey, have invented a new and useful Improvement in Pyrometry, of which the following is a specification.

My invention relates to measurement or indication of temperatures, and particularly to pyrometry or the measurement of high temperatures.

In accordance with my invention a thermo-couple, resistance thermometer or the like, subjected to the temperature to be measured, is employed to vary the potential of and control by a grid or equivalent control member of a thermionic device, as of the audion type, to effect a change in the current in the plate or anode circuit, which current produces an indication respecting the temperature to be measured.

My invention resides in a method and apparatus of the character hereinafter described.

For an illustration of means for carrying out my method and of some of the various forms my apparatus may take, reference is to be had to the accompanying drawing, in which:

Figure 1 is a diagrammatic view of a thermo-couple pyrometer.

Fig. 2 is a diagrammatic view of a modification.

Fig. 3 is a fragmentary diagrammatic view of an arrangement involving a resistance thermometer.

Referring to Fig. 1, T is a thermo-couple one of whose junctions is subjected to the temperature to be measured. It is connected by leads or conductors $a$, $a$ to the points $b$ and $c$. The point $b$ is connected to the grid $g$ of any suitable thermionic device, as V, comprising a bulb evacuated to any suitable degree and containing in addition to the grid $g$ the anode or plate $p$ and the incandescent cathode or filament $f$. The point $c$ communicates through the switch $d$, pivoted at $e$, with one terminal of the cathode or electron-emitting body $f$, which latter is traversed by current from the battery $h$ and varied by the adjustable resistance $r$. In the plate or anode circuit are included a source of current or battery B and the resistance R. In shunt to a variable portion of the resistance R are serially connected the adjustable resistance $r^1$, the galvanometer G, of D'Arsonval or any other suitable type, and the switch $d^1$, pivoted at $e^1$ and engaging contact $i$ connected to one terminal of the resistance R.

The mode of operation is as follows:

With the switches $d$ and $d^1$ in their illustrated positions, and with a junction of the thermo-couple T subjected to the temperature to be measured, the thermo-couple produces an electro-motive-force which is impressed upon the grid-filament circuit, and so controls the potential of the grid $g$, which in turn controls the magnitude of current from battery B flowing in the anode circuit through the resistance R. Assuming, by way of example merely, that the terminal of the thermo-couple which is connected to the grid $g$ is the positive terminal, with an increase of temperature to which the junction is subjected the potential of the grid $g$ will increase and so cause an increase of current through the resistance R, thereby causing a rise in the potential difference between the movable contact thereon and its lower terminal, thereby increasing the flow of current through the resistance $r^1$ and the galvanometer G whose deflection will accordingly increase the deflection of the instrument G serving as an indication or measure of the temperature to which the couple T is subjected, the calibration of the scale of the instrument G being either in electrical or temperature units, or both.

When the switch $d$ is thrown over into engagement with contact $j$, a standard cell C, or other standard of electro-motive-force, is brought into the grid circuit in place of the thermo-couple. Simultaneously the switch $d^1$ may be thrown over into engagement with contact $k$, thus bringing into the circuit of the galvanometer G an additional resistance $r^2$. Since a standard cell produces an electro-motive-force substantially higher than likely to be produced by a thermo-couple, by bringing the standard cell into the grid circuit the potential of the grid is considerably higher than when the thermo-junction is in circuit, with resultant higher plate circuit current which, with the same galvanometer G, might cause deflection of the needle to or beyond the end of its scale. To suitably cut down the current in the galvanometer G to suit this higher electro-motive-force in the grid circuit, the resistance $r^2$ of suitable value is provided.

With the standard cell C in the grid circuit and the resistance $r^2$ in the circuit of the galvanometer G, the resistance $r$ in the filament circuit may be adjusted to bring the temperature of the filament F to a value which will cause the instrument G to give a predetermined deflection. Then by returning the switches $d$ and $d^1$ to their illustrated positions the temperature of the filament $f$ is that which, with the thermo-couple T in circuit and the resistance $r^2$ cut out of the galvanometer circuit, will cause the deflections of the galvanometer to be correct for the different electro-motive-forces of the thermo-couple.

In Fig. 2 the arrangement is similar to that of Fig. 1. However, the thermo-couple T is now in a circuit inductively coupled to the grid circuit of the thermionic device V by transformer $t$ which is preferably a step-up transformer, in whose primary circuit the thermo-couple T, its leads $a$, $a$, the switch $d$ and the interrupter K are connected in series. The interrupter K comprises alternate conducting and insulating segments, the insulating segments being indicated at $m$, $m$, a brush $n$ connected to switch $d$ contacting alternately with conducting and insulating material. The point $b$ is connected with one terminal of the transformer primary whose other terminal is permanently connected with the conducting part of the interrupter K. A motor M or other suitable driving means of any suitable type rotates the interrupter K at suitable and preferably constant speed, whereby the direct current delivered by the thermo-couple T is interrupted, causing in the secondary of the transformer $t$ higher potential impulses which are impressed upon the grid $g$. The frequency of these impulses is preferably high enough suitably to exceed the natural period of the moving system of the galvanometer G. Here again the standard cell C and the resistance $r^2$ are employed in relation to each other similar to the relation described in connection with Fig. 1.

In addition to control of the grid circuit by a thermo-couple, it may be controlled by any other suitable temperature responsive means. Another such means is illustrated in Fig. 3, where $T^1$ is a resistance thermometer connected by leads $a$, $a$, in one arm of a Wheatstone bridge in whose other arms are suitable resistances $r^3$, $r^4$ and $r^5$. In one conjugate conductor of the bridge is connected a suitable source of current, as a battery $o$, and the other conjugate conductor $p^1$, $p^1$ has terminals corresponding with the points $b$ and $c$ of Figs. 1 and 2. In other words, the terminals of the conjugate conductor $p^1$, $p^1$, when the Wheatstone bridge is unbalanced, are in effect a source of potential impressed upon the points $b$, $c$ as in the case of a thermo-couple.

The operation of this Wheatstone bridge is that above described in connection with a thermo-couple. With the Wheatstone bridge arrangement the standard cell or other standard of electro-motive-force C may be employed, together with the additional galvanometer circuit resistance $r^2$ as above described.

What I claim is:

1. The method of measuring temperature, which consists in impressing an electro-motive-force upon a circuit including in part an evacuated space traversed by electrons, producing an electro-motive-force dependent upon the temperature to be measured, controlling therewith the electron stream in said space, and producing an indication by the current resulting in said circuit.

2. The method of measuring temperature, which consists in impressing an electro-motive-force upon a circuit including in part an evacuated space traversed by electrons, producing a current dependent upon the temperature to be measured, transforming said current to produce a pulsating electro-motive-force, controlling with said electro-motive-force the electron stream in said space, and producing an indication by the current resulting in said circuit.

3. The method of measuring temperature, which consists in impressing an electro-motive-force upon a circuit including in part an evacuated space traversed by electrons, subjecting a junction of a thermo-couple to the temperature to be measured, controlling in accordance with the electro-motive-force of said thermo-couple the electron stream in said space, and producing an indication by the current resulting in said circuit.

4. The method of measuring temperature, which consists in impressing an electro-motive-force upon a circuit including in part an evacuated space traversed by electrons, subjecting a junction of a thermo-couple to the temperature to be measured, transforming a current dependent upon the temperature of said junction to produce a pulsating electro-motive-force, controlling with said electro-motive-force the electron stream in said space, and producing an indication by the current resulting in said circuit.

5. Pyrometric apparatus comprising in combination with a thermionic device having an electron-emitting body, an anode circuit and a control electrode, means dependent upon the temperature to be measured for producing an electro-motive-force controlled by said temperature, connections for impressing said electro-motive-force upon said control electrode, and indicating means associated with the anode circuit of said thermionic device.

6. Pyrometric apparatus comprising in combination with a thermionic device comprising an electron-emitting body, an anode circuit and a control electrode, a transformer whose secondary is connected to said control electrode, means dependent upon the temperature to be measured producing in the primary circuit of said transformer current controlled by said temperature, means for interrupting said current in the primary circuit of said transformer, and an indicating instrument associated with the anode circuit of said thermionic device.

7. Pyrometric apparatus comprising in combination with a thermionic device comprising an electron-emitting body, an anode circuit and a control electrode, a thermo-couple having a junction subjected to the temperature to be measured, and connections for subjecting said control electrode to an electro-motive-force dependent upon said thermo-couple, and an indicating instrument associated with the anode circuit of said thermionic device.

8. Pyrometric apparatus comprising in combination with a thermionic device comprising an electron-emitting body, an anode circuit and a control electrode, a thermo-couple having a junction subjected to the temperature to be measured, a transformer whose secondary is connected to said control electrode, an interrupter in the primary circuit of said transformer interrupting current dependent upon said thermo-couple, and an indicating instrument associated with the anode circuit of said thermionic device.

9. Pyrometric apparatus comprising in combination with a thermionic device having an electron-emitting body, an anode circuit and a control electrode, means dependent upon the temperature to be measured for producing an electro-motive-force controlled by said temperature, connections for impressing said electro-motive-force upon said control electrode, indicating means associated with the anode circuit of said thermionic device, an electro-motive-force standard, means for switching said standard into operative relation with said control electrode in lieu of said first named means, and switching means for suitably correspondingly changing the resistance of the circuit of said indicating means.

10. Pyrometric apparatus comprising means producing a change of electro-motive-force in response to change in the temperature to be measured, a thermionic device having an electron-emitting body, a control electrode, and an anode in circuit with said body, connections for subjecting said control electrode to change of potential dependent upon change of said electro-motive-force, and a galvanometer controlled by the anode circuit of said thermionic device.

11. Pyrometric apparatus comprising means producing a change of electro-motive-force in response to change in the temperature to be measured, a thermionic device having an electron-emitting body, a control electrode, and an anode in circuit with said body, connections for subjecting said control electrode to change of potential dependent upon change of said electro-motive-force, and a galvanometer calibrated in temperature units controlled by the anode circuit of said thermionic device.

12. The method of measuring temperature, which consists in producing an electro-motive-force controlled by and dependent upon the temperature to be measured, varying thereby the electron stream in a thermionic device, and producing an indication controlled by the variation of said electron stream.

In testimony whereof I have hereunto affixed my signature this 16th day of April, 1919.

HARRY F. PORTER.